US010552126B2

(12) United States Patent
Branscome

(10) Patent No.: US 10,552,126 B2
(45) Date of Patent: Feb. 4, 2020

(54) TRANSITIONING BETWEEN CODE-BASED AND DATA-BASED EXECUTION FORMS IN COMPUTING SYSTEMS AND ENVIRONMENTS

(71) Applicant: TERADATA US, INC., Dayton, OH (US)

(72) Inventor: Jeremy L. Branscome, Santa Clara, CA (US)

(73) Assignee: Teradata US, Inc., San Diego, CA (US)

( * ) Notice: Subject to any disclaimer, the term of this patent is extended or adjusted under 35 U.S.C. 154(b) by 248 days.

(21) Appl. No.: 14/210,980

(22) Filed: Mar. 14, 2014

(65) Prior Publication Data

US 2014/0282440 A1 Sep. 18, 2014

Related U.S. Application Data

(60) Provisional application No. 61/787,084, filed on Mar. 15, 2013.

(51) Int. Cl.
| | | |
|---|---|---|
| *G06F 9/44* | (2018.01) | |
| *G06F 9/45* | (2006.01) | |
| *G06F 1/00* | (2006.01) | |
| *G06F 8/41* | (2018.01) | |
| *G06F 9/448* | (2018.01) | |

(52) U.S. Cl.
CPC ............... *G06F 8/41* (2013.01); *G06F 9/448* (2018.02)

(58) Field of Classification Search
CPC ... G06F 8/41; G06F 8/71; G06F 8/433; G06F 8/447; G06F 9/45516
See application file for complete search history.

(56) References Cited

U.S. PATENT DOCUMENTS

| | | | | |
|---|---|---|---|---|
| 5,329,611 | A * | 7/1994 | Pechanek | G06N 3/10 706/42 |
| 5,682,544 | A * | 10/1997 | Pechanek | G06F 15/8023 706/41 |
| 8,407,322 | B1 * | 3/2013 | Sasikumar | G06F 8/4441 709/220 |
| 8,639,544 | B1 * | 1/2014 | Flemma, Jr. | G06Q 30/0248 705/7.11 |
| 8,893,080 | B2 * | 11/2014 | Von Platen | G06F 9/4494 717/106 |
| 8,930,295 | B2 * | 1/2015 | Campbell | G06Q 40/00 706/46 |

(Continued)

*Primary Examiner* — Lewis A Bullock, Jr.
*Assistant Examiner* — Mohammad Kabir
(74) *Attorney, Agent, or Firm* — Ramin Mahboubian

(57) ABSTRACT

Techniques for transitioning between code-based and data-based execution forms (or models) are disclosed. The techniques can be used to improve the performance of computing systems by allowing the execution to transition from one of the execution models to another one of the execution models that may be more suitable for carrying out the execution or effective processing of information in a computing system or environment. The techniques also allow switching back to the previous execution model when that previous model is more suitable than the execution model currently being used. In other words, the techniques allow transitioning (or switching) back and forth between a data-based and code-based execution (or information processing) models.

12 Claims, 5 Drawing Sheets

(56) References Cited

U.S. PATENT DOCUMENTS

| | | | |
|---|---|---|---|
| 2004/0216045 A1* | 10/2004 | Martin | G06F 8/10 |
| | | | 715/255 |
| 2005/0010788 A1* | 1/2005 | Craft | G06F 21/123 |
| | | | 713/187 |
| 2005/0248597 A1* | 11/2005 | Kuhn | G06F 3/1217 |
| | | | 347/5 |
| 2006/0206696 A1* | 9/2006 | Saito | G06F 15/7867 |
| | | | 712/227 |
| 2007/0043957 A1* | 2/2007 | Benoit | G07F 7/1008 |
| | | | 713/193 |
| 2007/0226717 A1* | 9/2007 | Shtilman | G06F 8/443 |
| | | | 717/151 |
| 2008/0148277 A1* | 6/2008 | di Flora | G06F 8/443 |
| | | | 719/313 |
| 2008/0273698 A1* | 11/2008 | Manders | H04N 5/783 |
| | | | 380/200 |
| 2013/0097660 A1* | 4/2013 | Das | H04L 63/10 |
| | | | 726/1 |
| 2013/0290298 A1* | 10/2013 | Weyerhaeuser | G06F 17/30463 |
| | | | 707/719 |
| 2013/0318504 A1* | 11/2013 | Eker | G06F 11/3636 |
| | | | 717/128 |
| 2013/0325447 A1* | 12/2013 | Levien | G10L 15/30 |
| | | | 704/201 |
| 2014/0053129 A1* | 2/2014 | Von Platen | G06F 9/4436 |
| | | | 717/110 |

* cited by examiner

//  TRANSITIONING BETWEEN CODE-BASED AND DATA-BASED EXECUTION FORMS IN COMPUTING SYSTEMS AND ENVIRONMENTS

CROSS-REFERENCE TO THE RELATED APPLICATIONS

This application takes priority from the Provisional U.S. Patent Application No. 61/787,084, entitled: "TRANSITIONING EXECUTION BETWEEN DATAFLOW AND CODEFLOW," filed on Mar. 15, 2013, which is hereby incorporated by reference herein in its entirety.

BACKGROUND

Data can be an abstract term. In the context of computing environments and systems, data can generally encompass all forms of information storable in a computer readable medium (e.g., memory, hard disk). Data, and in particular, one or more instances of data can also be referred to as data object(s). As is generally known in the art, a data object can, for example, be an actual instance of data, a class, a type, or a particular form of data, and so on.

Von Neumann architecture or model is generally well known as a code-based (code flow or control flow) form or model of execution of computer code in a computing system or environment. More recently, data-based forms or models have been developed for computing systems. At least conceptually, a data-based form of execution may not have a program counter. As such, the execution can be determined based on the availability of input arguments (or data) to the instructions rather than the code (or instructions) as has been more traditionally done in the code-based execution forms such as the Von Neumann model.

In view of the prevalence of computing system in various aspects life today, it is apparent that code-based and data-based execution techniques are highly useful.

SUMMARY

Broadly speaking, the invention relates to computing environments and systems. More particularly, the invention relates to execution forms for execution of computer code.

In accordance with one aspect of the invention, techniques for transitioning between code-based and data-based execution forms (or models) are disclosed. The techniques can be used to improve the performance of computing systems by allowing the execution to transition from one of the execution models to another one of the execution models that may be more suitable for carrying out the execution or effective processing of information in a computing system or environment. The techniques also allow switching back to the previous execution model when that previous model is more suitable than the execution model currently being used. In other words, the techniques allow transitioning (or switching) back and forth between a data-based and code-based execution (or information processing) models.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

As noted in the background section, code-based and data-based execution techniques are highly useful for computing systems and environments that are relevant in various aspects of commerce and life today.

Generally, each model can be more effective in different applications and/or situations. Thus, there is a need to use both code-based and data-based execution techniques. However, conventionally only model is used for execution of a particular application, partly because of the significant differences between the models that can even directly contrast each other. Hence, an attempt to combine the code-based and data-based models would need to resolve difficult problems.

Nevertheless, despite these challenges, it will be appreciated that combining the code-based and data-based models can be highly beneficial, especially if it would allow effective use of each model when it is more suitable to use. In other words, it would highly beneficial to provide the ability to transition between the code-based and data-based models during the execution of the same application, especially in a manner that would allow using one of the models that is more suitable to perform a given task.

As such, it will be appreciated that transitioning between code-based and data-based execution forms are needed and would be very useful. Accordingly, techniques for transitioning between code-based and data-based execution forms (or models) are disclosed. The techniques can be used to improve the performance of computing systems by allowing the execution to transition from one of the execution models to another one of the execution models that may be more suitable for carrying out the execution or effective processing of information in a computing system or environment. The techniques also allow switching back to the previous execution model when that previous model is more suitable than the execution model currently being used. In other words, the techniques allow transitioning (or switching) back and forth between a data-based and code-based execution (or information processing) models.

Embodiments of these aspects of the invention are also discussed below with reference to FIGS. 1A-4. However, those skilled in the art will readily appreciate that the detailed description given herein with respect to these figures is for explanatory purposes as the invention extends beyond these limited embodiments.

Figure 1A:
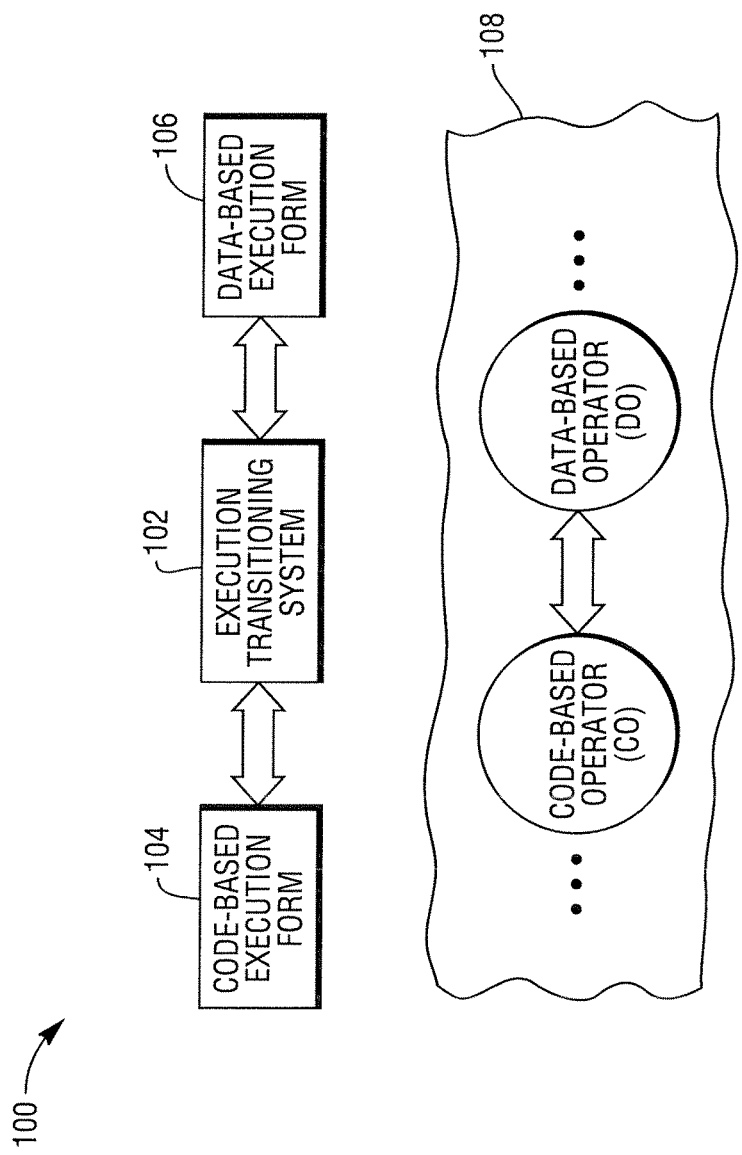
FIG. 1A depicts an execution transitioning (or switching) system in a computing environment in accordance with embodiment.

FIG. 1A depicts an execution transitioning (or switching) system 102 in a computing environment 100 in accordance with embodiment. Referring to FIG. 1A, the execution transitioning system 102 can effectively switch between a code-based execution form 104 and a data-based execution form 106. In other words, the execution transitioning system 102 can initiate execution of the executable code 108 in a first form of execution that can be either the code-based execution form 104 or a data-based execution form 106. Thereafter, the execution transitioning system 102 can determine whether to switch from the first form of execution to the second form of execution. Typically, this determination is made based on determining which form of execution may be more suitable for executing a particular part or portion of the executable code 108. If the execution transitioning system 102 determines to switch from one of the execution forms (a code-based execution form 104 and a data-based execution form 106) to another, the execution transitioning system 102 can effectively switch the form of execution to a form that may be more suitable. The execution transitioning system 102 can switch back to the first form of execution if it determines, for example, the first form of execution is more suitable for carrying out execution. As shown in FIG. 1A, the execution transitioning system 102 can effectively facilitate transitioning back and forth between and/or communication between a code-based operator (CO) provided for and/or representative of the code-based execution form 104 and a data-based operator (DO) provided for and/or representative of the data-based execution form 106.

It should be noted that the execution transitioning system 102 need not necessarily transition between the code-based execution form 104 and the data-based execution form 106 in a sequential manner. In other words, the execution transitioning system 102 can use or effectively facilitate use of the code-based execution form 104 and the data-based execution form 106 to execute the executable code 108. By way of example, activities between the execution form 104 and the data-based execution form 106 can be synchronized so that both forms, namely, the code-based execution form 104 and the data-based execution form 106 are used in an effective manner as will be described in greater detail below. This means that the execution transitioning system 102 can allow the effective use of both of the execution forms in an effective manner.

Those skilled in the art will appreciate that transitioning between the code-based execution form 104 and the data-based execution form 106 can, for example, include obtaining, receiving, processing, and/or transmission of data that can, for example, include one or more dataflows and/or data streams arranged for processing by a code-based machine and/or processor e.g., a codeflow machine, a code-streaming machine). The execution transitioning system 102 can be provided at least in part in various levels of implementation and architecture, for example, from firmware or software models (e.g., SOPs) executing on an x86 (or the like), to more optimized architectures (e.g., UOP execution embedded in a data-based processor) where the Instruction Set Architecture (ISA) can build in support for parsing and generating tuples in a manner which optimizes code-based operation latency and ultimate data throughput. In this case, it could, for example, be the ISA of an UOP execution architecture embedded in a data-based processor, wherein at least one instruction would include at least a fundamental form of transitioning support in accordance with one embodiment.

Figure 1B:
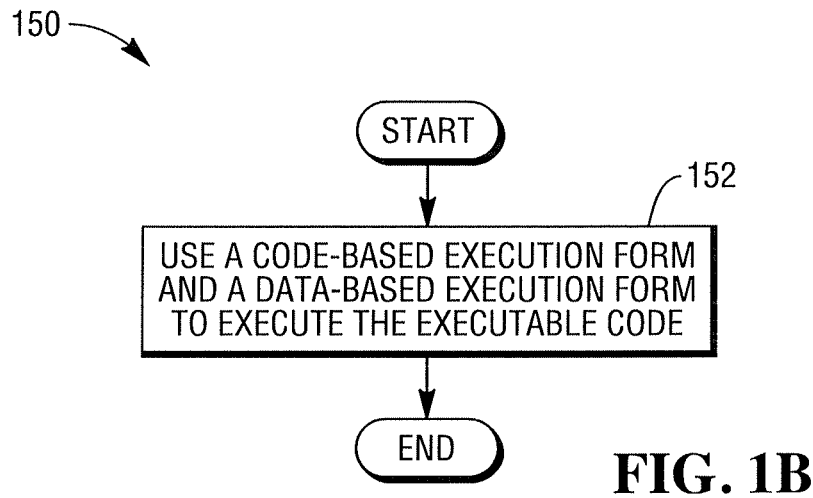
FIG. 1B depicts a method for executing executable code in accordance with one embodiment.

FIG. 1B depicts a method 150 for executing executable code in accordance with one embodiment. Method 150 can, for example, be used by the execution transitioning (or switching) system 102 (shown in FIG. 1A). Referring to FIG. 1B, a code-based execution form and a data-based execution form are both used (152) to execute the executable code. In other words, the method 150 comprises: using and/or facilitating (152) use of a code-based execution form and a data-based execution form to execute the executable code. It should be noted that the code-based execution and data-based execution forms can effectively be used together, or effectively combined, not necessarily in a sequential manner.

Figure 1C:
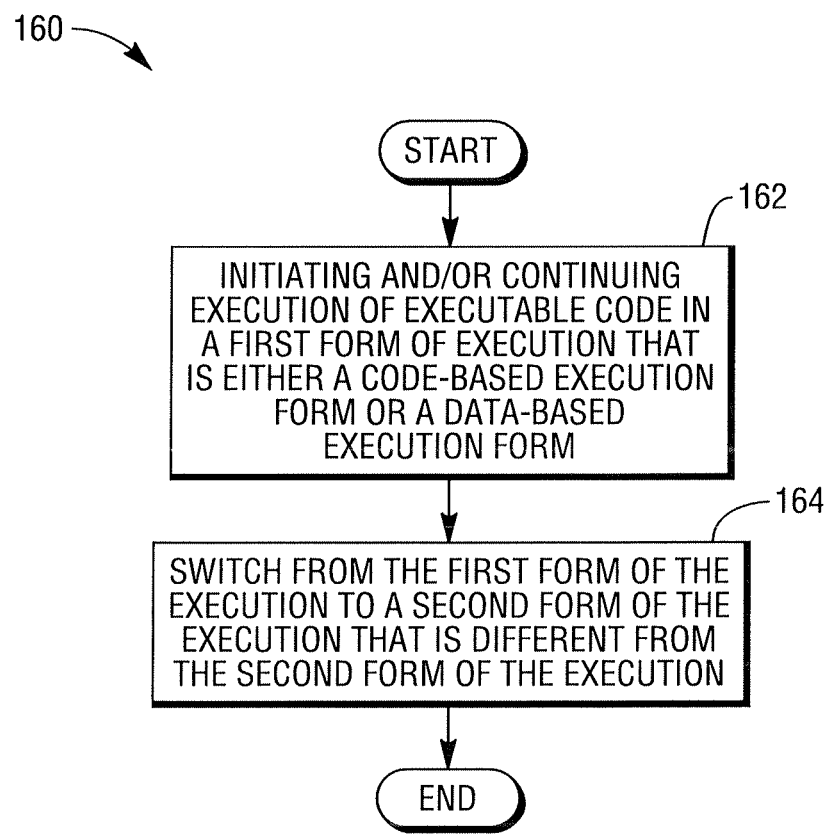
FIG. 1C depicts a method for executing executable code in accordance with one embodiment.

FIG. 1C depicts a method 160 for executing executable code in accordance with one embodiment. Method 160 can, for example, be used by the execution transitioning (or switching) system 102 (shown in FIG. 1A). Referring to FIG. 1C, execution of the executable code is initiated and/or continued (162) in a first form of execution that is either a code-based execution form or a data-based execution form. Next, the execution is switched (164) from the first form of execution to a different form of execution, namely, the second form of the execution. It should be noted that a determination can be made as to whether to switch from the first form of execution to the second form of the execution before the switch is made. Accordingly, the switch can be made during the execution of the executable code. The switch can, for example, further comprise: effectively providing location of data arranged in one or more data-based (e.g., dataflow) forms to a code-based execution processor for processing in code-based form, providing a direct location of the data arranged in one or more data-based forms, to a code-based execution processor for processing in code-based form, providing random access to the data arranged for processing in one or more data-based forms to a code-based execution processor for processing in code-based form, providing sequential access to the data arranged for processing in one or more data-based (dataflow) forms, to a code-based execution processor for processing in code-based form. Providing the location of data can, for example, comprise: identifying one or more patterns of data in data arranged for processing in a data-based form of processing, and providing data in the one or more patterns of data to a code-based execution processor for processing in a code-based form. The switching from the first form of flow of execution to the second form of flow of execution can, for example, further comprise, synchronizing one or more data portions arranged in one or more data-based forms, with data arranged in a code-based form for execution, so that the one or more data portions and the data in the code-based form can be executed by the code-based execution processor. The synchronizing of one or more data portions can, for example, further comprise: effecting stopping (e.g., pausing, delaying, buffering) the processing (e.g., processing of dataflows or data streams) of one or more data portions arranged for processing in one or more data-based forms so that the one or more data portions can be processed by a code-based execution processor for processing in code-based form. The switching of the execution form can, for example, switch the execution from a data-based form of execution to a code-based form of execution and then back to the data-based form of execution during the execution of executable code.

Figure 2:
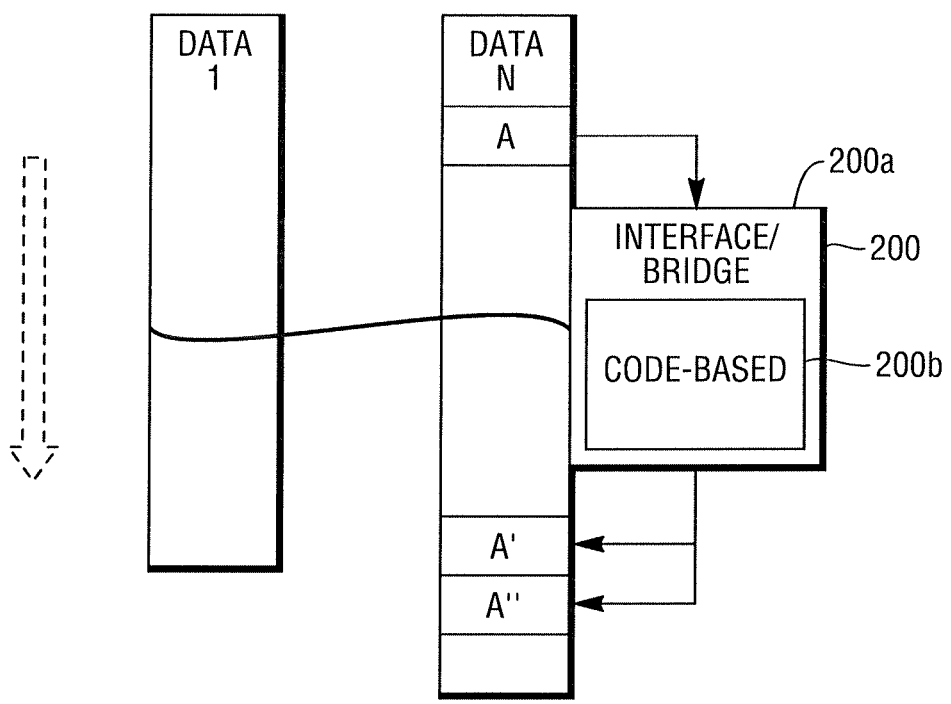
FIG. 2 depicts an execution transitioning system in accordance with another embodiment.

To further elaborate, FIG. 2 depicts an execution transitioning system 200 in accordance with another embodiment. Referring to FIG. 2, conceptually, the execution transitioning system 200 can be provided by an interface/bridge 200*a* for a code-based processor (e.g., a code-flow processor) 200*b*. The interface/bridge 200*a* can effectively allow the code-based processor 200*b* to process at least part of the data provided as one or more data portions 1-N arranged for processing by a data-based processor instead of the code-based processor 200*b*. The data portions 1-N can, for example, be provided as one or more data-flows or data-streams 1-N. In effect, the transitioning system 200 can process the data-portions in a side-band manner where one or more of the data portions 1-N can be effectively synchronized by the interface/bridge 200a for processing by the code-based processor 200b. In other words, a data portion 1-N may effectively pass by (side-band) a code-based processor 200b. This can include, as illustrated, the capability for the code-based processor 200b to observe and/or consume data from the data-portions and to deposit its execution results back into the data-portions at select locations.

However, more generally, a data portion 1-N (e.g., dataflow, data stream) may originate, terminate, pass beside, pass through in a code-based machine (e.g., a codeflow processor) or any combination thereof. In addition, latency can be minimized through a code-based machine (e.g., a codeflow processor) and throughput can be maximized. Also, mapping from N data portions 1-N (e.g., N dataflows, N data streams) to a given code-based machine (e.g., a codeflow processor) may, for example, be x:1 for any (0<=x<=N). That is, a given code-based machine may work on virtually anywhere from one data portion 1 up to all N data portions 1-N. Similarly, a data portion 1 may be operated upon by multiple code-based machines (e.g., codeflow processors) in a 1:y mapping (0<=y<=M), producing y distinct data portions.

Figure 3:
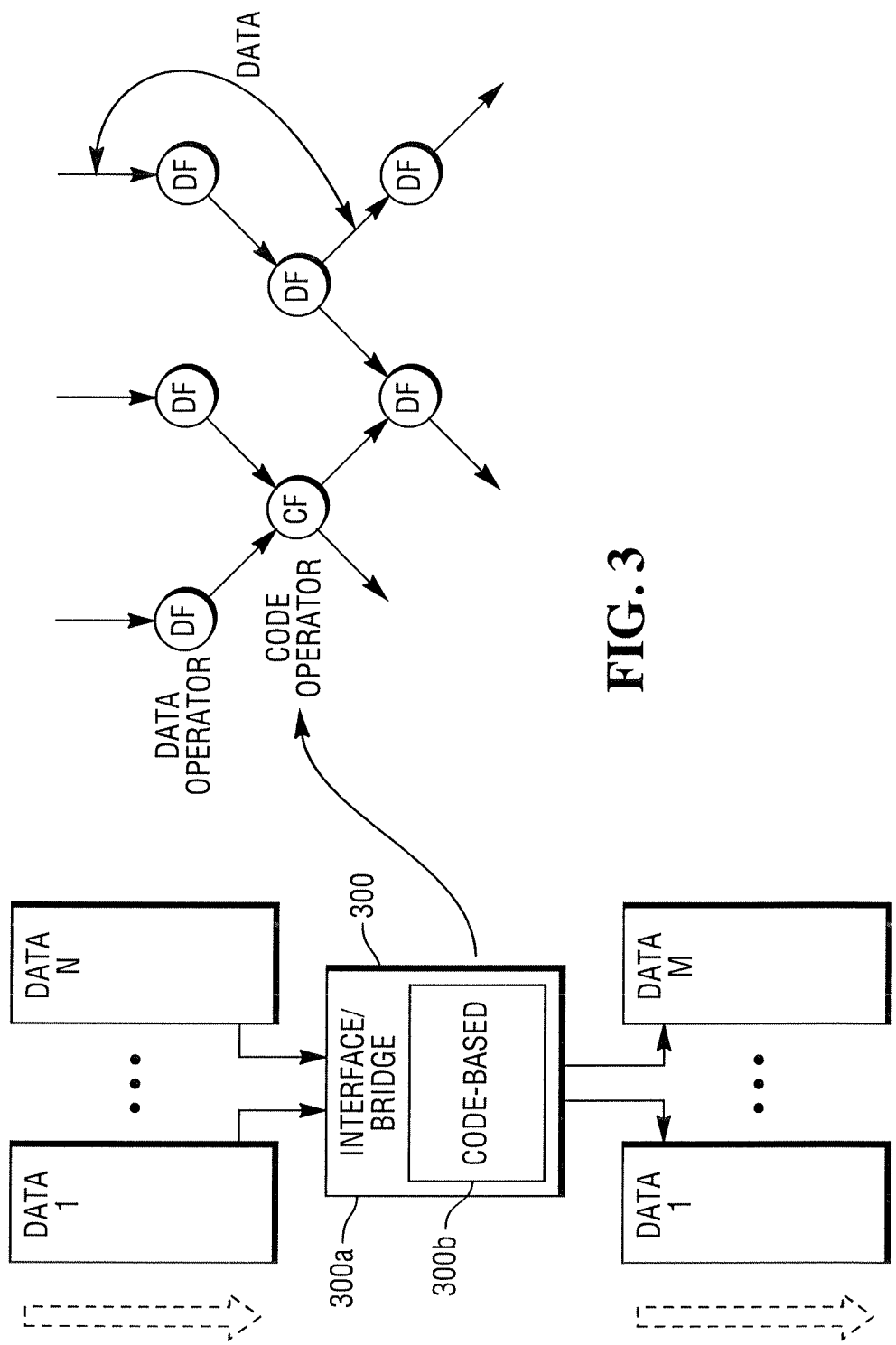
FIG. 3 depicts an execution transitioning system in accordance with yet another embodiment.

To elaborate even further, FIG. 3 depicts an execution transitioning system 300 in accordance with yet another embodiment. Referring to FIG. 3, conceptually, the execution transitioning system 300 can be provided by an interface/bridge 300a for a code-based processor (e.g., a codeflow processor) 300b. The interface/bridge 300a can effectively allow the code-based processor 300b to process one or more data portions. The interface/bridge 300a can effectively allow the code-based processor 300b to process at least part of the data provided as one or more data portions data portions 1-N arranged for processing by a data-based processor instead of the code-based processor 300b. The portions data portions 1-N can, for example, be provided as one or more data-flows or data-streams 1-N. In effect, the transitioning system 300 can process the data portions 1-N in an in-band manner where the data portions 1-N can go through the code-based processor 300b. As such, one or more data portions 1-M can be constructed or passed through the transitioning system 300 in response to the one or more data portions 1-N that are processed as input to the transitioning system 300. As shown in FIG. 3, a code-based operator, shown, for example, as a code flow operator (CF) can effectively be inserted into and/or connected into a data-based processing scheme that includes a number of data-based operators, shown, for example, as dataflow operators (DF's) that can represent a number of dataflows or data streams arranged and/or suitable for processing by a dataflow processor as those skilled in the art will appreciate.

Figure 4:
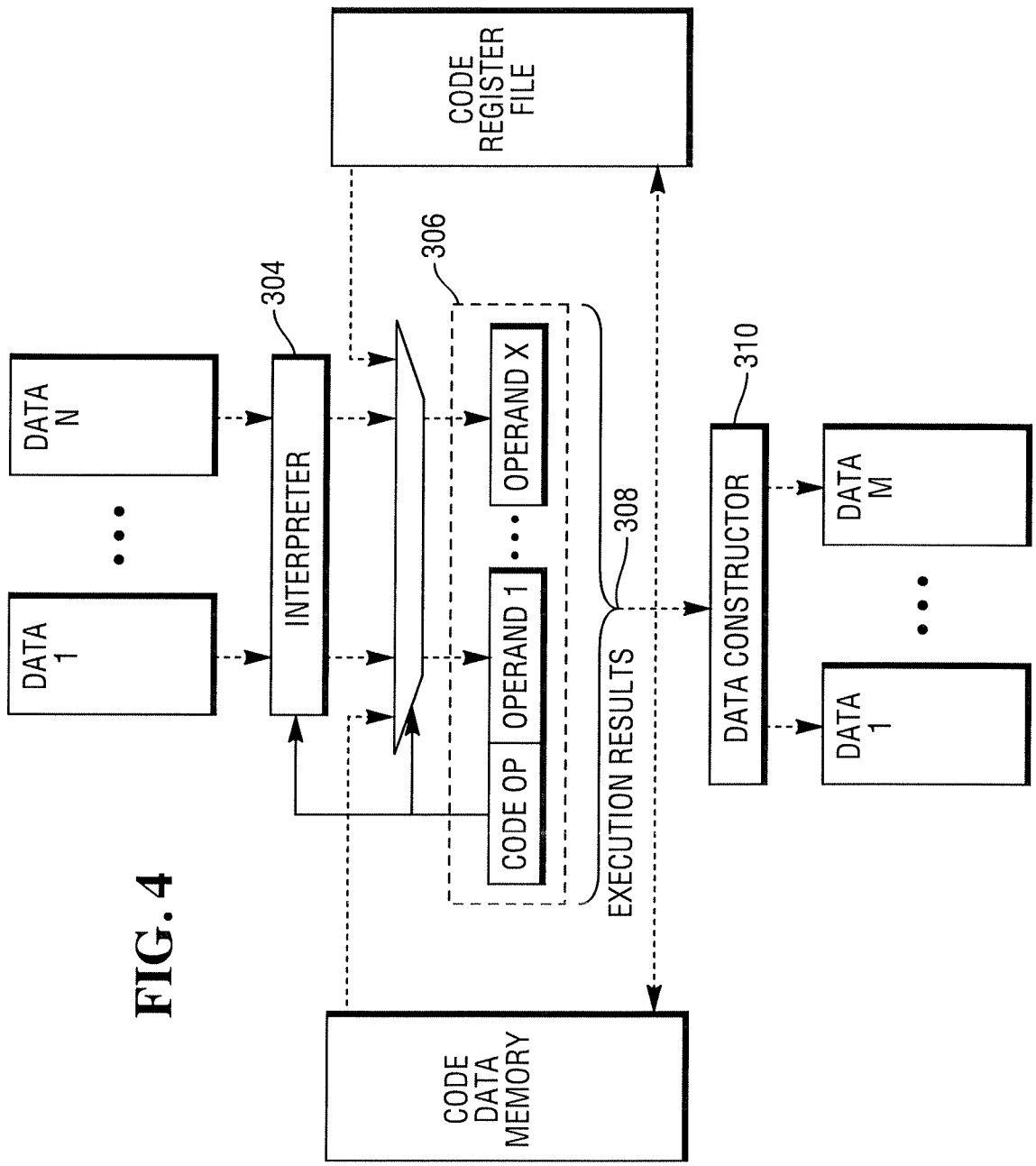
FIG. 4 depicts an execution transitioning system in greater detail in accordance with one embodiment.

To elaborate even further, FIG. 4 depicts in greater detail an execution transitioning system 300 (also shown in FIG. 3) in accordance with still another embodiment. Referring to FIG. 4, a Data Receiver/Parser/Interpreter (or interpreter) component 304 can gather data components of data portions 1-N for dispersal as operands of code-based instructions/operations, for example, by providing random access (e.g., windowed application by addressing of dataflow contents), sequential access (e.g., take components i, j, k, . . . in modulo fashion), associative access (e.g., get operand which 'best matches' given pattern). In addition, a data constructor 310, can accept the results of code-based instructions/operators as execution results 308, to form output data as data portions 1-M, where M can be equal to or different than N. The data constructor 310 can effectively insert or deposit data or results, including the execution results 308 back into one or more of the data portions 1-M that can be output, for example, by random access placement of output data into bypassed dataflow, sequential placement, "building up" of dataflow from each data output, and associative placement (e.g. place output just after data which 'best matches' given pattern into bypassed dataflow).

Furthermore, it should be noted that synchronization, control for interaction between input dataflow(s) and code-based machine, can be performed by an execution transitioning system, particularly in a bypassed data realization where the input data portions may be required to wait until certain code-based operations have completed (and results produced) before continuing the processing. This functionality can, for example, be implicitly provided as a part of a data Interpreter in a non-bypassed architecture, or can likewise be managed by a constructor in generating all or part of one or more outbound data portions (e.g., outbound dataflows or outbound data streams).

As an example, an instruction set architecture (ISA) may be designed to facilitate the direct control of a data interpreter, such that each instruction opcode of the ISA may execute directly on input data portions, as well as its conventional register and memory resources, in accordance with one embodiment. The ISA can, for example, admit direct control of a Data Constructor, such that origination of output data portions can be controlled by each opcode. The ISA can permit synchronization of one or more dataflows with code-based execution (e.g. a bypassed architecture).

It should be noted that transitioning execution to or from a conventional processor (e.g. x86) can be achieved, for example, by Interpreter and Constructor layers implemented, for example, in Software (SW), Firm Ware (FM) and/or in additional specialized hardware (HW). The transitioning of the execution to or from a conventional processor (e.g. x86) can facilitate data-based operand transfer, for example via, shared memory (with a conventional processor).

Additional information about data-based execution modes are provided, for example, in the following U.S. Patent Applications and Patents that are hereby incorporated by reference herein:

U.S. Pat. No. 8,244,718, Issued on Aug. 14, 2012, entitled Methods and Systems for Hardware Acceleration of Database Operations and Queries, by Joseph I. Chamdani et al.;

U.S. patent application Ser. No. 11/895,997, filed on Aug. 27, 2007, entitled Processing Elements of a Hardware Accelerated Reconfigurable Processor for Accelerating Database Operations and Queries, by Jeremy Branscome et al.;

U.S. application Ser. No. 12/098,988, Filed on Apr. 7, 2008, entitled Flexible Mechanical Packaging Form Factor for Rack Mounted Computing Devices, by Michael Corwin et al.;

U.S. patent application Ser. No. 12/099,076, filed on Apr. 7, 2008, entitled Methods and Systems for Run-Time Scheduling Database Operations that are Executed in Hardware, by Joseph Chamdani et al.;

U.S. Pat. No. 7,966,343, Issued on Jun. 21, 2011, entitled Accessing Data in a Column Store Database Based on Hardware Compatible Data Structures, by Liuxi Yang, et. al.

U.S. patent application Ser. No. 12/099,133, filed on Apr. 7, 2008, entitled Accessing Data in a Column Store Database on Hardware Compatible Indexing and Replicated Reordered Columns, by Krishnan Meiyyappan, et al.

U.S. Pat. No. 7,895,151, Issued on Feb. 22, 2011, entitled Fast Bulk Loading and Incremental Loading of Data into a Database, by James Shau, et al.;

U.S. patent application Ser. No. 12/144,486, filed on Jun. 23, 2008, entitled Methods and Systems for Real-Time Continuous Update, by Kapil Surlaker et al., U.S. patent application Ser. No. 12/168,821, filed on Jul. 7, 2008, entitled Methods and Systems for Generating Query Plans that are Compatible for Execution in a Hardware, Ravi Krishnamurthy et al.;

U.S. Pat. No. 8,165,988, Issued on Apr. 24, 2012, entitled Fast Bulk Loading and Incremental Loading of Data into a Database Hardware Accelerated, by James Shau, et al.;

U.S. Pat. No. 8,224,800, Issued on Jul. 17, 2012, entitled Reconfigurable Processor for Accelerating Database Operations and Queries Hardware Accelerated, by Jeremy Branscome, et al.;

U.S. Pat. No. 8,229,918, Issued on Jul. 24, 2012, entitled Reconfigurable Processor for Accelerating Database Operations and Queries Hardware Accelerated, by Jeremy Branscome, et al.;

U.S. Pat. No. 8,234,267, Issued on Jul. 31, 2012, entitled Reconfigurable Processor for Accelerating Database Operations and Queries Accessing Data in a Column, by Jeremy Branscome, et al.;

U.S. patent application Ser. No. 13/107,399, filed on May 13, 2011, entitled Accessing Data in Column Store Database Based on Hardware Compatible Data Structures, by Liuxi Yang et al.;

U.S. patent application Ser. No. 13/172,790, filed on Jun. 29, 2011, entitled Methods and Systems for Hardware Acceleration of Database Operations and Queries Based on Multiple Hardware Accelerators, by Jeremy Branscome et al.;

U.S. patent application Ser. No. 13/172,792, filed on Jun. 29, 2011, entitled Methods and Systems for Hardware Acceleration of Database Operations and Queries Based on Multiple Hardware Accelerators, by Jeremy Branscome et al.;

U.S. patent application Ser. No. 13/172,798, filed on Jun. 29, 2011, entitled Methods and Systems for Dataflow Integration for Hardware Acceleration of Database Operations and Queries based on Multiple Hardware Accelerators, by Joseph Chamdani et al.;

U.S. patent application Ser. No. 13/172,799, filed on Jun. 29, 2011, entitled Methods and Systems for Hardware Acceleration of Database Operations and Queries for a Versioned Database based on Multiple Hardware Accelerators, by James Shau et al.

Generally, various aspects, features, embodiments or implementations of the invention described above can be used alone or in various combinations. Furthermore, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method of executing executable code, wherein the method is implemented at least partly by a device, and wherein the method comprises:
    using a code-based execution form and a data-based execution form together to execute the same executable code, by at least:
        executing executable code, wherein the executing the executable code in a first form of execution that is either the code-based execution form or the data-based execution form;
        during the execution, performing at least the following:
            obtaining at least a part of data needed to execute the executable code arranged in the data-based form;
            obtaining at least a part of the data needed to execute the executable code arranged in the code-based form;
            providing location of data arranged in the data-based execution form, to a code-based execution processor for processing in the code-based execution form, during the execution of the same executable code;
            providing location of data arranged in the code-based form to a data-based execution processor for processing in the data-based form, during the execution of the same executable code;
            identifying one or more patterns of data in data arranged for processing in the data-based form of processing; and providing the data in the one or more identified patterns of data to the code-based execution processor for processing in the code-based form;
            and thereafter, switching from the first form of the execution to a second form of the execution that is a different from the second form of the execution, wherein the switching from the first form of the execution to the second form of the execution further comprises: switching between a data-based operator and code-based operator during the execution of the executable code by at least effectively providing a location of data arranged in one or more data-based form to a code-based execution processor for processing in the code-based form, during the execution of the executable code.

2. The method of claim 1, wherein the method further comprises:
    determining whether to switch from the first form of execution to the second form of the execution; and
    switching from the first form of the execution to the second form of the execution when the determining determines to switch from the first form of the execution to the second form of the execution.

3. The method of claim 1, wherein the effectively providing of the location of data comprises:
    providing a direct location of the data arranged in one or more data-based forms, to a code-based execution processor for processing in code-based form.

4. The method of claim 1, wherein the effectively providing of the location of data comprises:
providing random access to the data arranged for processing in one or more data-based forms, to a code-based execution processor for processing in code-based form.

5. The method of claim 1, wherein the effectively providing of the location of data comprises: providing sequential access to the data arranged for processing in one or more data-based forms, to a code-based execution processor for processing in code-based form.

6. The method of claim 1, wherein the switching from the first form of flow of execution to the second form of flow of execution further comprises:
synchronizing one or more data portions arranged in one or more data-based forms, with data arranged in a code-based form for execution, so that the one or more data portions and the data in the code-based form can be executed by the code-based execution processor.

7. The method of claim 6, wherein the synchronizing of one or more data portions further comprises:
effectively stopping the processing of one or more data portions arranged for processing in one or more data-based forms so that the one or more data portions can be processed by a code-based execution processor.

8. The method of claim 1, wherein the switching from the first form of flow of execution to a second form of flow of execution further comprises:
switching from a data-based form of execution to a code-based form of execution and then back to the data-based form of execution during the execution of executable code.

9. The method of claim 1, wherein the method further comprises: construction of output dataflow (Data Constructor) or modification of existing dataflow.

10. A device that includes one or more processors configured to use a code-based execution form and a data-based execution form to execute executable code, by performing the steps of:
executing executable code, wherein the executing the executable code in a first form of execution that is either the code-based execution form or the data-based execution form;
during the execution, performing at least the following:
obtaining at least a part of data needed to execute the executable code arranged in the data-based form;
obtaining at least a part of the data needed to execute the executable code arranged in the code-based form;
providing location of data arranged in the data-based execution form, to a code-based execution processor for processing in the code-based execution form, during the execution of the same executable code;
providing location of data arranged in the code-based form to a data-based execution processor for processing in the data-based form, during the execution of the same executable code;
identifying one or more patterns of data in data arranged for processing in the data-based form of processing; and providing the data in the one or more identified patterns of data to the code-based execution processor for processing in the code-based form; and
thereafter, switching from the first form of the execution to a second form of the execution that is a different from the second form of the execution, wherein the switching from the first form of the execution to the second form of the execution further comprises: switching between a data-based operator and code-based operator during the execution of the executable code by at least effectively providing location of data arranged in one or more data-based forms, to a code-based execution processor for processing in code-based form, during the execution of the executable code.

11. The device of claim 10, wherein the one or more processors configured to use one or more instructions from an Instruction Set Architecture (ISA) reference.

12. A non-transitory computer storage medium storing instructions that when executed uses a code-based execution form and a data-based execution form together in order to process data in a computing device, by performing the steps of:
executing executable code, wherein the executing the executable code in a first form of execution that is either the code-based execution form or the data-based execution form;
during the execution, performing at least the following:
obtaining at least a part of data needed to execute the executable code arranged in the data-based form;
obtaining at least a part of the data needed to execute the executable code arranged in the code-based form;
providing location of data arranged in the data-based execution form, to a code-based execution processor for processing in the code-based execution form, during the execution of the same executable code;
providing location of data arranged in the code-based form to a data-based execution processor for processing in the data-based form, during the execution of the same executable code;
identifying one or more patterns of data in data arranged for processing in the data-based form of processing; and providing the data in the one or more identified patterns of data to the code-based execution processor for processing in the code-based form; and
thereafter, switching from the first form of the execution to a second form of the execution that is a different from the second form of the execution, wherein the switching from the first form of the execution to the second form of the execution further comprises: switching between a data-based operator and code-based operator during the execution of the executable code by at least effectively providing location of data arranged in one or more data-based forms, to a code-based execution processor for processing in code-based form, during the execution of the executable code.

* * * * *